United States Patent
Hur et al.

(10) Patent No.: US 10,854,131 B2
(45) Date of Patent: Dec. 1, 2020

(54) DISPLAY DEVICE AND CONTROL METHOD THEREOF, AND RECORDING MEDIA

(71) Applicant: SAMSUNG ELECTRONICS CO., LTD., Suwon-si (KR)

(72) Inventors: Jae-myung Hur, Seongnam-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/110,512

(22) Filed: Aug. 23, 2018

(65) Prior Publication Data

US 2019/0096315 A1 Mar. 28, 2019

(30) Foreign Application Priority Data

Sep. 26, 2017 (KR) .......................... 10-2017-0124031

(51) Int. Cl.
*G09G 3/20* (2006.01)
*G06F 3/147* (2006.01)
(Continued)

(52) U.S. Cl.
CPC ........... *G09G 3/2096* (2013.01); *G06F 3/147* (2013.01); *H04N 21/43635* (2013.01);
(Continued)

(58) Field of Classification Search
CPC .. G06F 3/147; G09G 3/2096; G09G 2310/08; G09G 2354/00; G09G 2370/047;
(Continued)

(56) References Cited

U.S. PATENT DOCUMENTS

2007/0143590 A1* 6/2007 Lee ...................... G06F 9/4406
713/2
2008/0170164 A1 7/2008 Park
(Continued)

FOREIGN PATENT DOCUMENTS

EP 1 936 979 A2 6/2008
EP 2 651 144 A1 10/2013
(Continued)

OTHER PUBLICATIONS

Extended European Search Report dated Oct. 18, 2018 from European Patent Application No. 18193289.8, 9 pages.
(Continued)

*Primary Examiner* — Jacinta M Crawford
(74) *Attorney, Agent, or Firm* — Staas & Halsey LLP

(57) ABSTRACT

A display device includes a signal receiver connecting with one among a plurality of source devices, and configured to receive a content signal from the connected source device. A display is configured to display an image based on a content signal received through the signal receiver. A processor is configured to acquire time information corresponding to a time from a point of connecting with the source device to a point of displaying an image when the source device is connected to the signal receiver, and to control the display to display a user interface (UI) to indicate a connected state based on the acquired time information.

17 Claims, 11 Drawing Sheets

(51) Int. Cl.
*H04N 21/4363* (2011.01)
*H04N 21/443* (2011.01)
*H04N 21/442* (2011.01)

(52) U.S. Cl.
CPC ... *H04N 21/4432* (2013.01); *H04N 21/44231* (2013.01); *G09G 2310/08* (2013.01); *G09G 2354/00* (2013.01); *G09G 2370/047* (2013.01); *G09G 2370/12* (2013.01)

(58) Field of Classification Search
CPC ......... G09G 2370/12; H04N 21/43635; H04N 21/44231; H04N 21/4432
See application file for complete search history.

(56) References Cited

U.S. PATENT DOCUMENTS

| | | | |
|---|---|---|---|
| 2009/0066688 A1* | 3/2009 | Song | G06F 9/4401 345/418 |
| 2010/0289949 A1* | 11/2010 | Kobayashi | G06F 13/4081 348/469 |
| 2010/0302455 A1* | 12/2010 | Maegaki | H04N 21/482 348/706 |
| 2011/0030007 A1* | 2/2011 | Cho | H04N 7/17318 725/40 |
| 2011/0185164 A1* | 7/2011 | Okano | G06F 11/0757 713/2 |
| 2012/0110630 A1 | 5/2012 | Golobrodsky et al. | |
| 2012/0278603 A1 | 11/2012 | Lee | |
| 2013/0176440 A1 | 7/2013 | Arling et al. | |
| 2015/0102670 A1 | 4/2015 | Son et al. | |
| 2015/0271435 A1 | 9/2015 | Gao | |
| 2016/0062774 A1* | 3/2016 | Yuan | H04N 5/4401 713/2 |
| 2016/0142647 A1* | 5/2016 | Gopinath | G06F 16/783 348/706 |
| 2016/0216876 A1* | 7/2016 | Lee | G06F 3/04842 |
| 2017/0147455 A1* | 5/2017 | Sakuma | G06F 11/2028 |
| 2017/0193962 A1* | 7/2017 | Yoon | G09G 5/006 |
| 2018/0091845 A1* | 3/2018 | Lee | H04L 12/12 |

FOREIGN PATENT DOCUMENTS

| | | |
|---|---|---|
| EP | 3 190 787 A1 | 7/2017 |
| KR | 10-2008-0066379 | 7/2008 |
| KR | 10-2012-0122183 | 11/2012 |
| KR | 10-2016-0090583 | 8/2016 |

OTHER PUBLICATIONS

International Search Report and Written Opinion of the International Searching Authority dated Dec. 19, 2018 from International Patent Application No. PCT/KR2018/009590, 9 pages.
European Office Action dated Jul. 31, 2019 from European Patent Application No. 18193289.8, 7 pages.
European Office Action dated Jun. 23, 2020 from European Application No. 18193289.8, 9 pages.

* cited by examiner

DISPLAY DEVICE AND CONTROL METHOD THEREOF, AND RECORDING MEDIA

CROSS-REFERENCE TO RELATED THE APPLICATION

This application is based on and claims priority under 35 U.S.C. § 119 to Korean Patent Application No. 10-2017-0124031 filed on Sep. 26, 2017 in the Korean Intellectual Property Office, the disclosure of which is incorporated by reference herein in its entirety.

BACKGROUND

Field

The present disclosure relates to a display device used as a sink device capable of displaying a content image by receiving and processing a content signal from a source device, a control method thereof and a recording medium, and more particularly to a display device having a structure for determining whether a content signal is normally output or not from a specific source device when a user issues a command to switch an input source over to the specific source device.

Description of the Related Art

Among electronic devices basically including electronic parts such as a central processing unit (CPU), a chipset, a memory, and the like to compute and process predetermined information in accordance with certain processes, a display device refers to a device specialized to display an image. The display device processes an input signal received from an external image source and displays the input signal as an image on a display panel of various types such as liquid crystal, etc. The display device generally provided to a user is achieved by a television (TV), a monitor, etc. For example, the display device provided as the TV displays an image of a user's desired broadcasting channel by applying various processes such as tuning, de-multiplexing, decoding, etc. to a broadcast signal received from a broadcasting station, or displays a content image by processing image data received from a content provider through a network.

Typically, the content provider is regarded as a source device in terms of providing content, and the display device is regarded as a sink device in terms of reproducing content in sync with the content provider. To reproduce content in the sink device, a user adjusts a corresponding source device in the sink device, and turns on the source device. Typically, a user waits until the source device is booted up and then outputs a content signal to the sink device, and then performs the following operations.

However, the source devices of various kinds and models are not uniform but different in time taken in booting up from system power-on and time taken in outputting a content signal in accordance with device characteristics. For example, a user may wait until a desired content image is displayed after switching a designated input source over to a certain source device in the sink device and then turning on the source device. In a case where the certain source device outputs a content signal relatively late, a user may determine that the source device is not turned on, and turn off the source device being normally booted up.

Such a situation is caused by various operational differences of the source devices because the source devices are different in time taken in being booted up and time taken from a power-on point to a point of outputting a content signal, some source devices may have a characteristic of maintaining a black screen for a predetermined period of time even after the content signal is output, and so on.

Therefore, if the sink device is capable of determining a state of a source device following a user's control and informing the user of the state, inconvenience due to a user's incorrect determination will be mitigated. In this regard, there is a need of such a sink device capable of performing these operations.

SUMMARY

According to an embodiment of the present disclosure, there is provided a display device including: a signal receiver connecting with one among a plurality of imaging devices, and configured to receive an image signal from the connected imaging device; a display configured to display an image based on an image signal received through the signal receiver; and a processor configured to: acquire time information about time required from a point of connecting with the imaging device to a point of displaying an image when one among the plurality of imaging devices is connected to the signal receiver, and process the display to display a user interface (UI) for informing a connected state corresponding to a current point after connecting with the imaging device based on the time information. Thus, the display device determines an operational state of an imaging device and informs a user of the operational state during a time before displaying an image based on an image signal output from the imaging device, thereby preventing the user from incorrectly determining the state of the imaging device.

The processor may perform a process to acquire the time information and display a UI for a period of time up to a point of receiving a preset signal, and change information guided on the UI in accordance with whether the present signal is received at a receiving point designated in the time information.

The preset signal may include at least one of a clock signal and a content signal.

The processor may perform a process to make the information on the UI be changed for informing that the imaging device is normally connected when the preset signal is normally received at the receiving point, but make the information on the UI be changed for informing that the imaging device is not normally connected when the preset signal is not normally received at the receiving point.

The processor may perform a process to display a UI for informing a kind or model name of the imaging device for a period of time from the connection point up to a point of receiving a clock signal from the imaging device.

The processor may change information guided on a UI when a period of time required from a point of outputting a clock signal to a point of outputting a content signal is greater than a threshold, but does not change the information guided on the UI when the period of time required is not greater than the threshold.

The processor may derive a period of time required from a point of connecting with the imaging device to the point of receiving the preset signal from the time information, and may determine the receiving point designated in the time information based on the derived period of time required.

The processor may measure a period of time required up to a point of outputting the present signal from the imaging device by a predetermined number of times, and may store an average of periods of time required, which are measured by the predetermined number of times, as the time information corresponding to the imaging device.

The processor may determine a point of transmitting a control signal for turning on the imaging device to the imaging device as a point of connecting with the imaging device.

According to another embodiment of the present disclosure, there is provided a method of controlling a display device, the method including: connecting with one among a plurality of imaging devices; acquiring time information about time required from a point of connecting with the imaging device to a point of displaying an image; displaying a user interface (UI) for informing a connected state corresponding to a current point after connecting with the imaging device based on the time information; and displaying an image based on an image signal when the image signal is output from the imaging device.

The displaying of the UI may include acquiring the time information and displaying a UI for a period of time up to a point of receiving a preset signal, and changing information guided on the UI in accordance with whether the present signal is received at a receiving point designated in the time information.

The preset signal may include at least one of a clock signal and a content signal.

The changing of the information guided on the UI may include: making the information on the UI be changed for informing that the imaging device is normally connected when the preset signal is normally received at the receiving point; and making the information on the UI be changed for informing that the imaging device is not normally connected when the preset signal is not normally received at the receiving point.

The displaying of the UI may include displaying a UI for informing a kind or model name of the imaging device for a period of time from the connection point up to a point of receiving a clock signal from the imaging device.

The displaying of the UI may include: changing information guided on a UI when a period of time required from a point of outputting a clock signal to a point of outputting a content signal is greater than a threshold; but making no changes in the information guided on the UI when the period of time required is not greater than the threshold.

The displaying of the UI may include deriving a period of time required from a point of connecting with the imaging device to the point of receiving the preset signal from the time information, and determining the receiving point designated in the time information based on the derived period of time required.

The method may further include measuring a period of time required up to a point of outputting the present signal from the imaging device by a predetermined number of times, and storing an average of periods of time required, which are measured by the predetermined number of times, as the time information corresponding to the imaging device.

The method may further include determining a point of transmitting a control signal for turning on the imaging device to the imaging device as a point of connecting with the imaging device.

According to another embodiment of the present disclosure, there is provided a non-transitory computer-readable medium recording instructions for execution by a processor of an apparatus to cause the apparatus to perform operations including: connecting with one among a plurality of imaging devices; acquiring time information about time required from a point of connecting with the imaging device to a point of displaying an image; displaying a user interface (UI) for informing a connected state corresponding to a current point after connecting with the imaging device based on the time information; and displaying an image based on an image signal when the image signal is output from the imaging device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF EXEMPLARY EMBODIMENTS

Below, exemplary embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Figure 1:
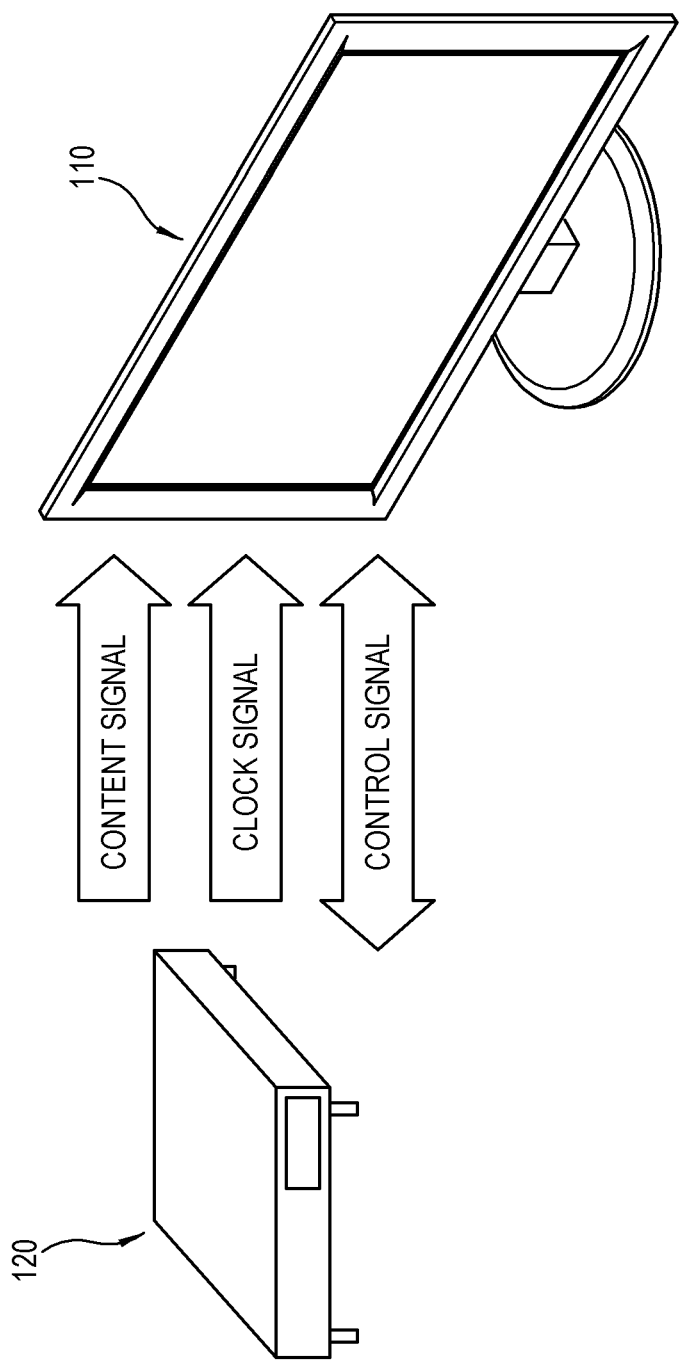
FIG. 1 illustrates a sink device and a source device according to one embodiment of the present disclosure.

FIG. 1 illustrates a sink device and a source device according to one embodiment of the present disclosure.

As shown in FIG. 1, a system according to one embodiment of the present disclosure includes a sink device 110 and a source device 120 which are connected to communicate with each other. The sink device 110 includes a display device for processing a content signal output from the source device 120 and displaying a content image. The sink device 110 may include various kinds of display device, such as a TV, a monitor, a portable multimedia player, and the like for home use, and a digital signage, a video wall and the like for outdoor advertisement.

The source device 120 outputs a content signal to the sink device 110. The source device 120 may be a device for generating a content signal in itself or a device for receiving a content signal from the outside. The former device includes a set-top box. The latter device includes an optical disc player such as a Blu-ray disc player or a digital versatile disc (DVD) player, a game console, etc. The content signal output from the source device 120 may for example refer to a signal in which video data, audio data, appended data, etc. of certain content are multiplexed.

Connection between the source device 120 and the sink device 110 is based on one of various wired or wireless protocols. This embodiment will be described on assumption that the content signal is transmitted from the source device 120 to the sink device 110 through high-definition multimedia interface (HDMI) protocols, but there are no limits to the protocols of transmitting the content signal.

The source device 120 outputs a content signal of a transition minimized differential signaling (TMDS) format. Between the source device 120 and the sink device 110 are formed communication channels such as a TMDS data channel for transmitting a TMDS from the source device 120, a TMDS clock channel for transmitting a clock signal of the source device 120, a display data channel (DDC) for exchanging information about environments and states between the source device 120 and the sink device 110, a consumer electronic control (CEC) for exchanging a control signal, etc. These channels are related to the HDMI standards, and other signal transmission standards are applied when the connection between the source device 120 and the sink device 110 is not based on the HDMI.

In the sink device 110 with the foregoing configuration, a series of operations for displaying an image by processing a content signal output from the source device 120 is as follows.

A user sets the source device 120 to be designated as an input source for the sink device 110, and turns on the source device 120. As a method of turning on the source device 120, a user may directly press a power button of the source device 120, or control a remote controller of the sink device 110 to transmit a control signal for turning on the source device 120 from the sink device 110 to the source device 120.

When the source device 120 is turned on, the source device 120 is booted up in accordance with a predetermined booting sequence. The booted source device 120 transmits a clock signal for clock synchronization between the sink device 110 and the source device 120. The source device 120 generates and transmits a content signal to the sink device 110.

Meanwhile, the sink device 110 waits for receiving a signal output from the source device 120. When receiving a clock signal from the source device 120, the sink device 110 performs clock synchronization with the source device 120 in accordance with the received clock signal. Then, when the source device 120 outputs a content signal, the sink device 110 processes the content signal and displays a content image.

Here, a moment when the source device 120 or the sink device 110 starts a predetermined operation for transmitting a content signal from the source device 120 to the sink device 110 will be called a source-switching start point for convenience.

The source-switching start point may be set as one among many points of time as follows. For example, the source-switching start point may include a moment when the source device 120 is connected for communication to the sink device 110; a moment when the source device 120 which is turned off, is manually turned on by a user; a moment when the sink device 110 transmits a control signal for turning on the source device 120 which is turned off, to the source device 120; a moment when an input source of the sink device 110 is switched over to the source device 120; a moment when the source device 120 is switched from a sleep mode or a standby mode over to a normal mode for normal operation, etc.

In this embodiment, the source-switching start point refers to the moment when the control signal for turning on the source device 120 which is turned off is transmitted from the sink device 110 to the source device 120, but various points of time may be regarded as the source-switching start moments in accordance with designs.

The source device 120 has its own characteristics of various factors such as a device type, a device mode, a manufacturer, a hardware structure, a software structure, a characteristic of a generated content signal, etc. For convenience, a time from the source-switching start point to a point of displaying a content image will be called a preparatory period. In accordance with the characteristics of the source device 120, the preparatory period may be relatively long or short. When the preparatory period is relatively long, a user may incorrectly determine that the source device 120 is being turned off or the input source is set by mistake in the sink device 110.

Therefore, the sink device 110 according to one embodiment of the present disclosure acquires time information about a time taken from the source-switching start point to the point of displaying the content image, and displays a UI for showing a connected state of the source device 120 corresponding to a current point after connection of the source device 120 based on the acquired time information. The sink device 110 acquires the time information during the preparatory period, and changes the information shown in the UI about the source device 120 in accordance with whether a preset signal to be output from the source device 120 is received or not.

Thus, the sink device 110 informs a user of the connected state or operational state of the source device 120 during the preparatory period, and thus prevents the user from incorrectly determining the operational state of the source device 120 and performing for unnecessary control. In this regard, descriptions will be made later.

Below, internal elements of the sink device 110 and the source device 120 will be described.

Figure 2:
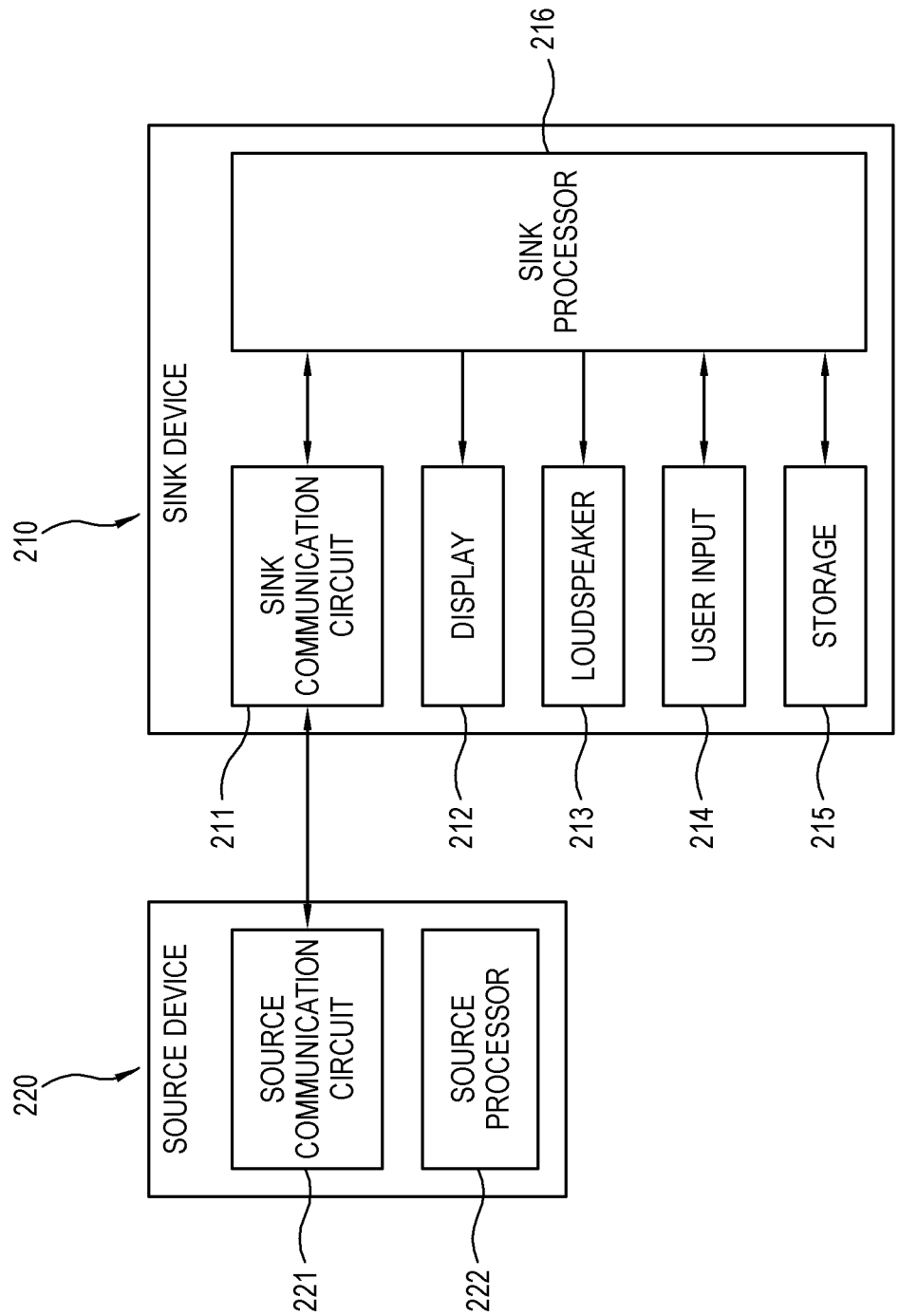
FIG. 2 is a block diagram of a sink device and a source device according to one embodiment of the present disclosure.

FIG. 2 is a block diagram of a sink device and a source device according to one embodiment of the present disclosure.

As shown in FIG. 2, a sink device 210 includes a sink communication circuit 211 for communicating with a source device 220, a display 212 for displaying an image, a loudspeaker 213 for outputting a sound, a user input 214 for receiving a user's control input, a storage 215 for storing data, and a sink processor 216 for processing a content signal and processing operations of the sink device 210.

The source device 220 includes a source communication circuit 221 for communicating with the sink device 210, and a source processor 222 for processing a content signal to be output to the sink device 210 through the source communication circuit 221. The source communication circuit 221 is provided corresponding to the sink communication circuit 211, and basic operations of the source processor 222 are equivalent to those of the sink processor 216. Therefore, detailed descriptions about the elements of the source device 220 will be avoided.

The sink communication circuit 211 is a data input/output interface in which communication modules or ports corresponding to various kinds of communication protocols are combined. The sink communication circuit 211 basically refers to a signal receiver for receiving a content signal from the source device 220, but may interactively transmit and receive a signal. The sink communication circuit 211 in this embodiment connects with the source device 220 through an HDMI cable, but there are no limits to the protocols supported by the sink communication circuit 211. The sink communication circuit 211 may for example include at least one among elements such as an Ethernet module for receiving packet data from the Internet through a wire, a wireless communication module for receiving packet data wirelessly, a connection port to which a universal serial bus (USB) memory device or the like external memory device is connected, etc.

The display 212 includes a display panel for displaying an image on a screen thereof. The display panel may have a liquid crystal type or the like structure for receiving light, or an organic light emitting diode (OLED) type or the like structure for emitting light in itself. The display 212 may include an additional element in accordance with the types of the display panel. For example, when the display panel is the liquid crystal type, there are additionally provided a backlight unit for emitting light to a liquid crystal display (LCD) panel, a panel driving substrate for driving liquid crystal of the LCD panel, etc.

The loudspeaker 213 outputs a sound based on an audio signal. The loudspeaker 213 may include a unit loudspeaker corresponding to a piece of audio data for a certain audio channel, and may include a plurality of unit loudspeakers respectively corresponding to pieces of audio data for a plurality of audio channels.

The user input 214 transmits a preset control command or information to the sink processor 216 in response to a user's control or input. The user input 214 may be achieved in various forms according to input methods of the information, and may be for example materialized by user interface environments installed in the sink device 210, such as a key provided outside the sink device 210, a touch screen installed on the display 212, a microphone for receiving a user's speech, a camera for recognizing or sensing a user's gesture or the like, a sensor, etc. Further, the user input 214 may include a remote controller physically separated from the sink device 210.

The storage 215 is accessed by the sink processor 216, and makes data undergo reading, recording, modifying, deleting, updating and the like operations under control of the sink processor 216. The storage 215 may include a flash memory, a hard disk drive, a solid state drive (SSD), and the like nonvolatile memory capable of retaining data regardless of whether the sink device 210 is turned on or off; and a buffer, a random access memory (RAM) and the like to which data to be processed is loaded.

The sink processor 216 processes a content signal received in the sink communication circuit 211 so that content can be reproduced. For example, the sink processor 216 extracts video data and audio data from a content signal, and processes the video data and the audio data so that the display 212 can display an image and the loudspeaker 213 can output a sound. The sink processor 216 includes a hardware processor achieved in a central processing unit (CPU), a chipset, a buffer, a circuit, etc. mounted on a printed circuit board, and may be achieved by a system on chip (SoC) in accordance with designs.

The sink processor 216 may include a demultiplexer, a decoder, a scaler, an audio digital signal processor (DSP), an amplifier, and the like modules corresponding to various processes, some of which may be materialized as the SoC. For example, the demultiplexer, the decoder, the scaler and the like modules related to video processing may be materialized as a video processing SoC, and the audio DSP may be materialized as a chipset separated from the SoC.

Below, a method of controlling the sink device 210 will be described.

Figure 3:
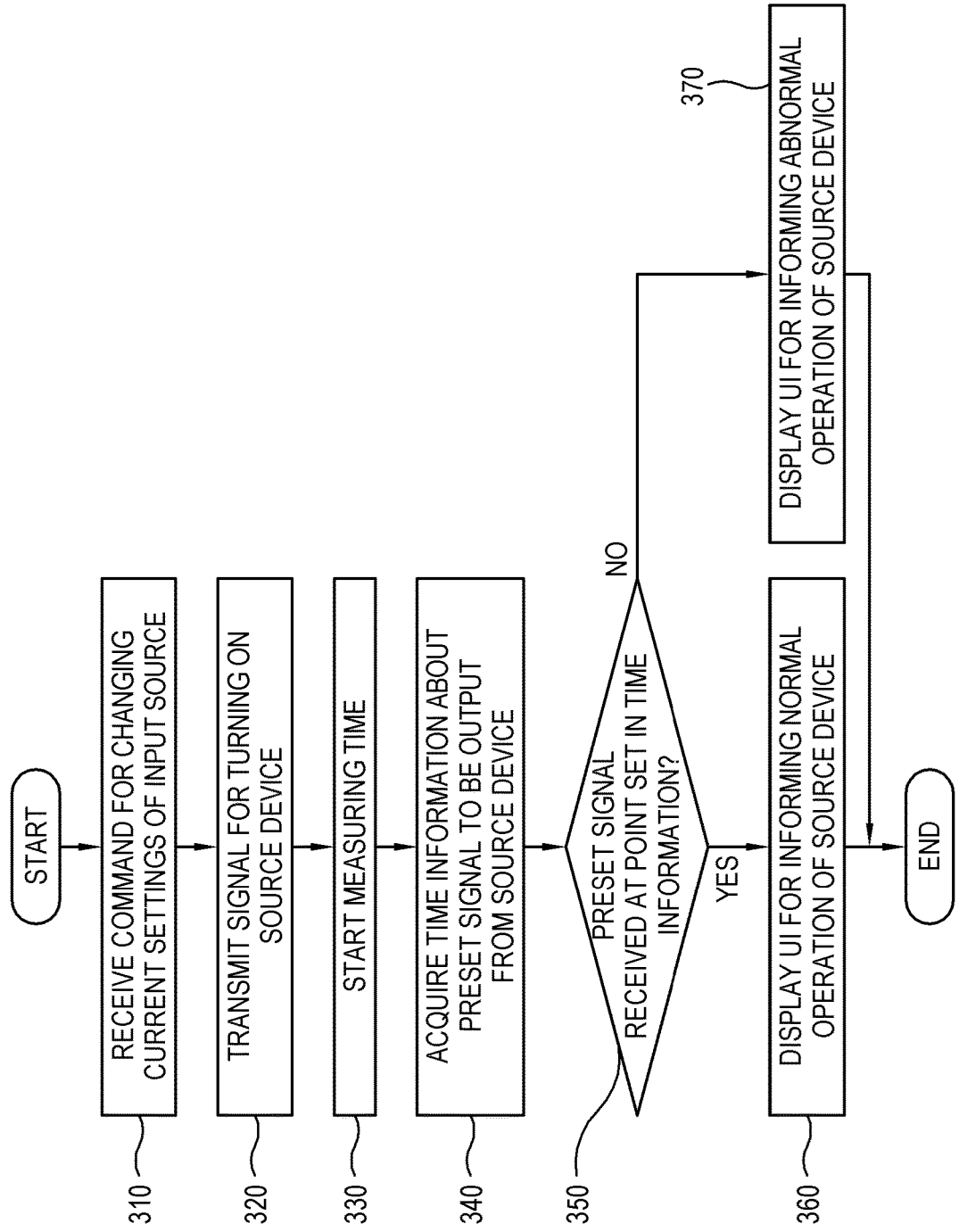
FIG. 3 is a flowchart of controlling a sink device according to one embodiment of the present disclosure.

FIG. 3 is a flowchart of controlling a sink device according to one embodiment of the present disclosure.

As shown in FIG. 3, at operation 310 the sink device receives a user's command for setting a current input source to be switched over to a source device. The sink device provides a predetermined UI in response to a user's input, thereby allowing the user to select one among a plurality of source devices through the UI.

At operation 320, the sink device transmits a control signal for turning on the source device to a source device. The control signal may be generated by the sink device in response to a user's input, or may be automatically generated as the sink device determines the power state of the source device in accordance with changes in the settings of the input source.

At operation 330 the sink device starts measuring time from a point of turning on the source device. For example, the sink device measures time that elapses from a point of transmitting a signal for turning on the source device to the source device.

At operation 340 the sink device acquires time information about a preset signal that can be output from the source device, which is stored corresponding to the source device. Here, there are many methods of acquiring the time information. As one example of the methods, the sink device measures time taken in outputting the preset signal from the selected device to the sink device, through a previous training process, and stores the measured time as the time information. Here, the preset signal may include various signals that can be output from the source device. For example, a clock signal or a content signal may be used as the preset signal.

At operation 350 the sink device determines whether the corresponding signal is received from the source device at a point indicated by the acquired time information. For example, when a point of outputting the clock signal from the source device has been recorded in the time information, the sink device determines whether the source device outputs the clock signal at the point.

When the corresponding signal is received at the point, at operation 360 the sink device displays a UI of showing that the source device normally operates.

On the other hand, when the corresponding signal is not received at the point, at operation 370 the sink device displays a UI of showing that the source device does not normally operate.

Thus, the sink device in this embodiment can inform a user whether the source device operates normally or not before displaying the content image.

Regarding the time information described with the foregoing operation 340, various kinds of signals that can be output from the source device may be employed as the preset signal. However, the clock signal is preferable in this embodiment. Below, the reason why the clock signal is preferable in this embodiment will be described.

Figure 4:
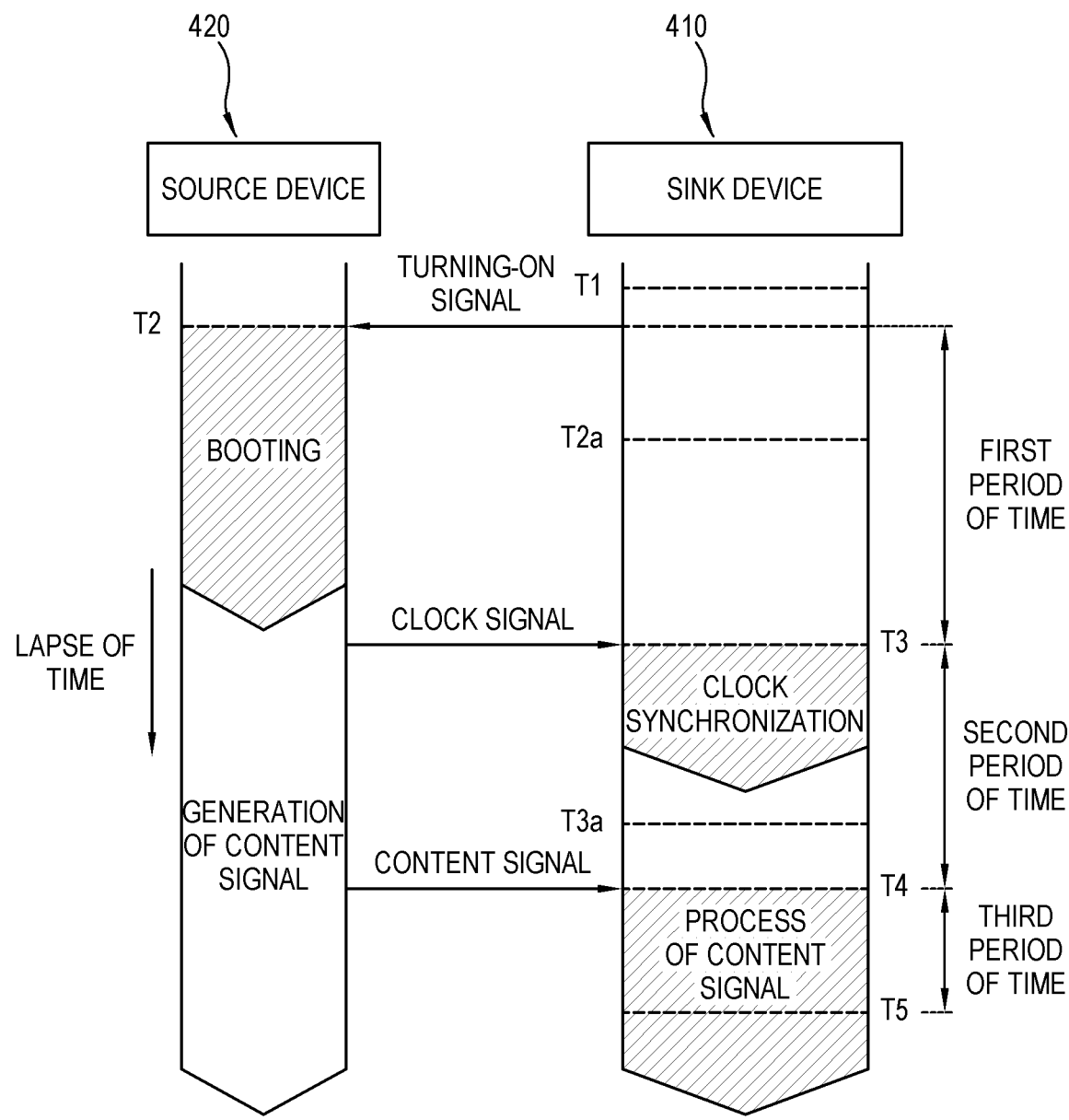
FIG. 4 illustrates a sequence of operations performed in a sink device and a source device to display a content image in the sink device according to one embodiment of the present disclosure.

FIG. 4 illustrates a sequence of operations performed in a sink device and a source device to display a content image in the sink device according to one embodiment of the present disclosure.

As shown in FIG. 4, when a user desires to select a certain source device 420 and make a sink device 410 display an image based on a content signal from the source device 420, the user switches an input source of the sink device 410 over to the source device 420 at a point T1. For example, a user can select a certain source device 420 for receiving a content signal among a plurality of source devices 420 connected to the sink device 410 by wires or wirelessly.

The sink device 410 transmits a turning-on signal to the source device 420 at a point T2, thereby turning on the source device 420. Therefore, the sink device 410 determines that the source device 420 starts being booted up at the point T2.

The completely booted source device 420 first outputs a clock signal before outputting the content signal, and the clock signal is received in the sink device 410 at a point T3. Then, the source device 420 generates the content signal.

The sink device 410 performs clock synchronization with the source device 420 in accordance with the clock signal received at the point T3.

When the source device 420 outputs the content signal, the sink device 410 receives the content signal from the source device 420 at a point T4. The sink device 410 processes the content signal and displays an image based on the processed content signal at a point T5.

Like this, the source device 420 first transmits the clock signal to the sink device 410 before generating and transmitting the content signal to the sink device 410. When the clock synchronization is not performed between the source device 420 and the sink device 410, the content signal from the source device 420 is not normally reproduced in the sink device 410. Therefore, there is a need of outputting the clock signal earlier than the content signal.

A first period between the point T2 at which the source device 420 starts being booted up and the point T3 at which the sink device 410 receives the clock signal, and a second period between the point T3 and the point T4 at which the sink device 410 receives the content signal are varied depending on unique characteristics of the source device 420. Further, a third period between the point T4 and the point T5 at which the content image is displayed is caused because signal processing such as demultiplexing, decoding, etc. is performed in the sink device 410.

For example, the second period may be relatively short as much as 1 second, lasts for 3 seconds longer than 1 second, or relatively long as much as 6 seconds in accordance with the source devices 420. Although different people feel differently, it will be usually inconvenient for a user to wait for 3 seconds or more without any image.

Therefore, the sink device 410 monitors whether the clock signal is received or not, and thus determines the operational state of the source device 420 with earlier timing.

The sink device 410 acquires the time information about the source device 420 at a certain point T2*a* between the point T2 at which the source device 420 starts being booted up and the point T3 at which the sink device 410 the clock signal is received. Typically, the sink device 410 is storing device information about connectable source devices 420. Therefore, the sink device 410 can specify the source device 420 based on the previously stored device information when a certain source device 420 is selected as the input source. The sink device 410 acquires the time information corresponding to the selected source device 420 from the previously stored time information about many source devices 420.

The sink device 410 determines time required corresponding to the first period based on the acquired time information, and thus determines a reference point for receiving the clock signal from the source device 420 with timing earlier than the point T3 in accordance with the time required. After receiving the clock signal, the sink device 410 determines whether the point T3 of receiving the clock signal matches with the reference point, i.e. whether the first period corresponds to the time required set in the time information.

When it is determined that the point T3 matches with the reference point, the sink device 410 displays a UI at the point T3a during the second period so as to inform a user that the source device 420 normally operates. On the other hand, when it is determined that the point T3 does not match with the reference point, the sink device 410 displays a UI for informing a user that the source device 420 does not normally operate.

The UI may be variously given in accordance with contents involved therein, and there are no limits to a specific example of the UI. Below, the examples of the UIs displayed according to situations will be described.

Figure 5:
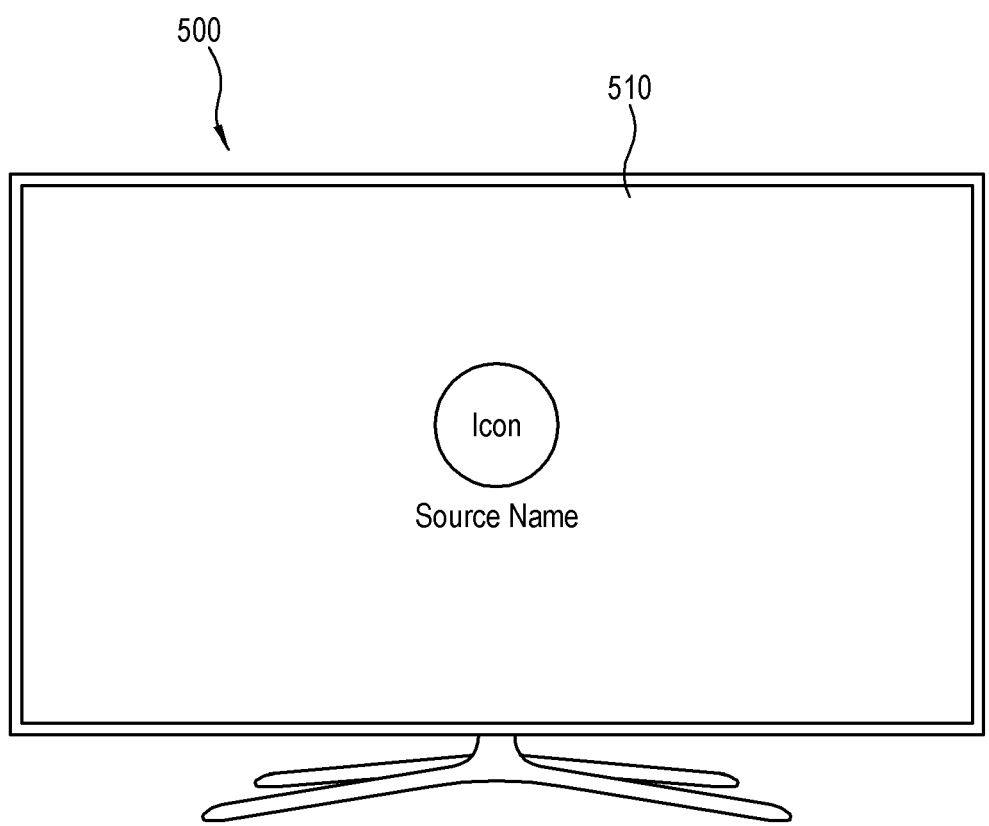
FIG. 5 illustrates a user interface (UI) displayed when a sink device according to one embodiment of the present disclosure switches an input source over to a source device.

FIG. 5 illustrates a UI displayed when a sink device according to one embodiment of the present disclosure switches an input source over to a source device.

As shown in FIG. 5, a sink device 500 displays a UI 510 in the following case. As a user designates a certain source device as a content input source among various external devices connectable to the sink device 500, the source device currently connected to the sink device 500 is specified. The sink device 500 acquires the device information about the specified source device, and displays the UI 510 based on the acquired device information.

The UI 510 includes simple information about the source device on the background of a generally simple black screen. In FIG. 5, the "Icon" may refer to an icon of showing the kind of source device, and the "Source Name" may refer to a text of showing the kind and model name of the source device. For example, when the source device designated as the input source is a Blu-ray disc player, the UI 510 includes the icon of showing the Blu-ray disc player on the center of the background of the black screen, and the text of showing the kind or model name of source device, i.e. the "Blu-ray disc player." Thus, a user can easily know what source device is currently connected.

While the UI 510 is being displayed, the sink device 500 acquires the time information where timing of receiving the clock signal is set.

Figure 6:
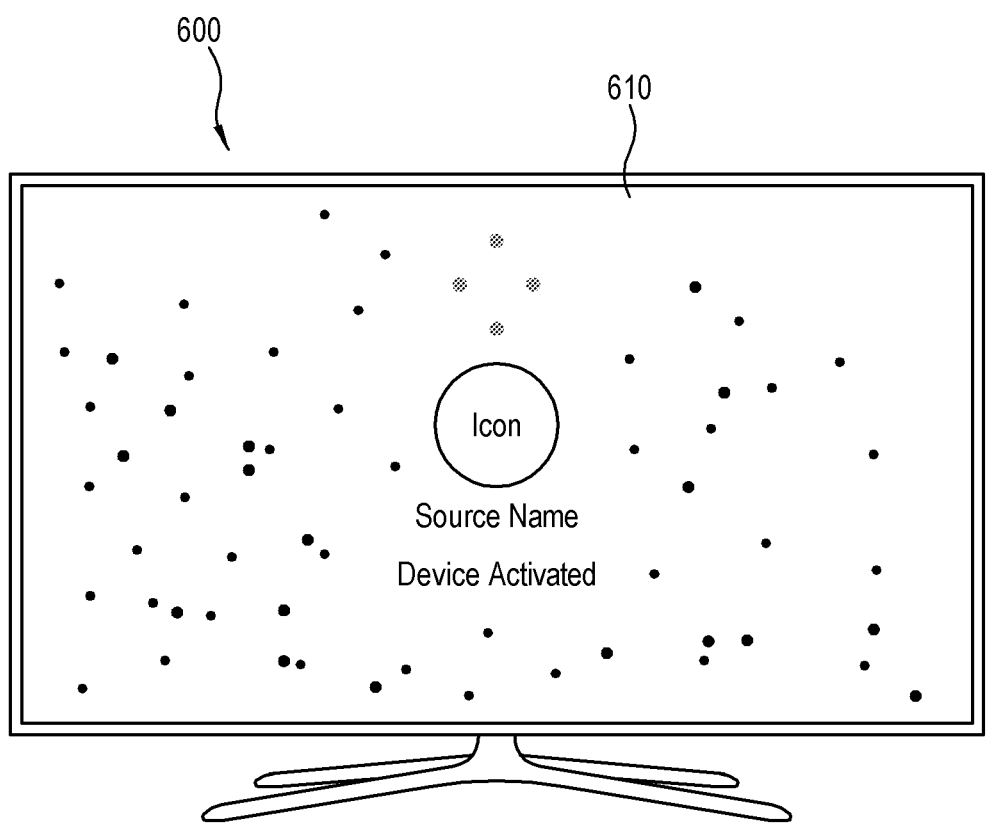
FIG. 6 illustrates a UI displayed when a sink device according to one embodiment of the present disclosure determines a normal operation of a source device.

FIG. 6 illustrates a UI displayed when a sink device according to one embodiment of the present disclosure determines a normal operation of a source device.

As shown in FIG. 6, a sink device 600 displays a UI 610 in the following case. The sink device 600 determines whether a clock signal is received from the source device with the timing set in the time information. When the clock signal is received from the source device with the set timing, the sink device 600 determines that the source device operates normally, and displays the UI 610 for informing the determination.

The UI 610 is displayed with additional visual effects as compared with the foregoing UI of FIG. 5, so that a user can easily recognize a state change. For example, the UI 610 includes "Device Activated" or the like text as a meaning that the current source device operates normally, in addition to the icon of showing the kind of source device and the text of showing the kind and model name of source device. Further, the UI 610 includes an animation of water drop or the like on the black background of mono color, and thus explicitly shows that there is a state change from the UI of FIG. 5.

Figure 7:
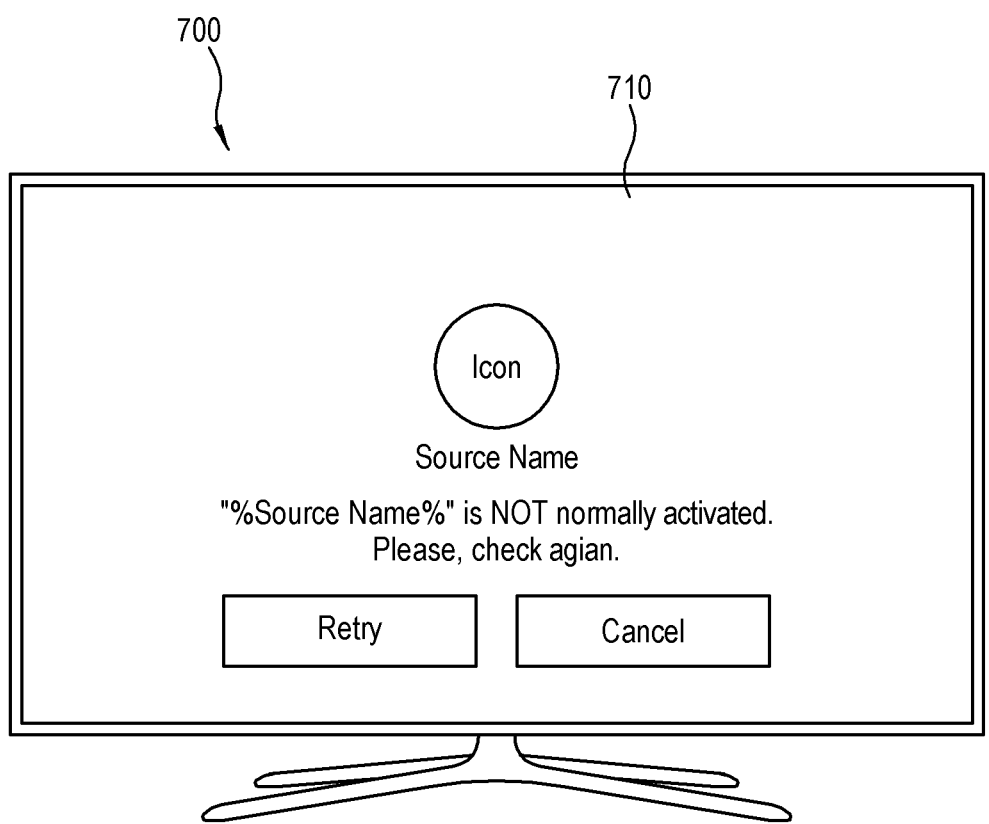
FIG. 7 illustrates a UI displayed when a sink device according to one embodiment of the present disclosure determines an abnormal operation of a source device.

FIG. 7 illustrates a UI displayed when a sink device according to one embodiment of the present disclosure determines an abnormal operation of a source device.

As shown in FIG. 7, a sink device 700 displays a UI 710 in the following case. The sink device 700 determines whether a clock signal is received from a source device with timing set in the time information. When the clock signal is not normally received from the source device with the set timing, the sink device 700 determines the source device does not operate normally, and displays the UI 710 of showing the determination.

In FIG. 7, "% Source Name %" indicates the kind or model name of source device. That is, the UI 710 includes a text of showing that the source device does not normally operate now, thereby guiding a user who has watched the UI 710 to take follow-up actions.

Like this, the sink device 700 determines the operational state of the source device, and displays a UI properly in accordance with determination results.

Meanwhile, in the foregoing embodiments, the sink device derives the time information through the previous training process and stores it. Below, the training process of deriving the time information by the sink device will be described.

Figure 8:
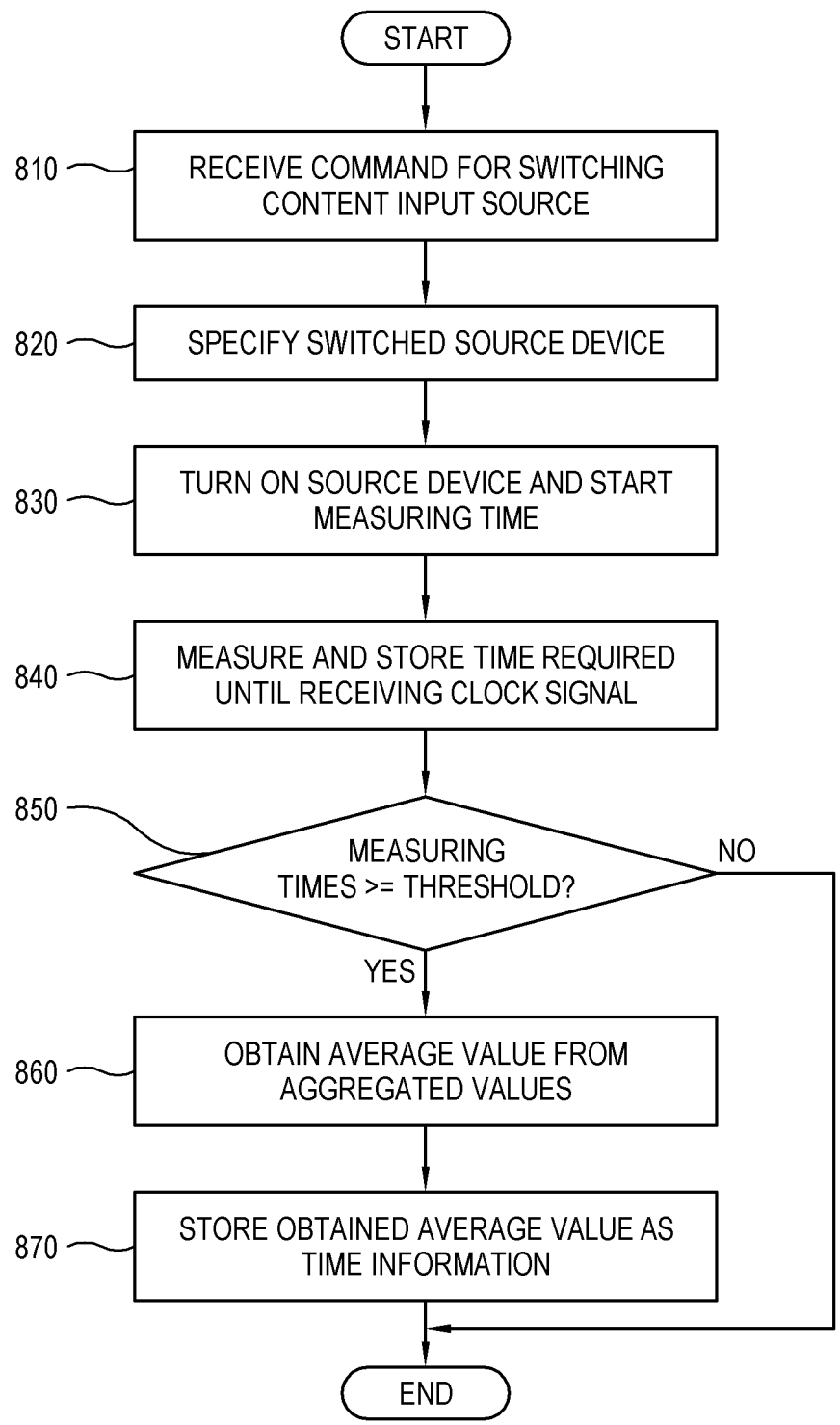
FIG. 8 is a flowchart that illustrates a method of deriving time information by measuring time taken in outputting a clock signal from a source device to a sink device in the sink device according to one embodiment of the present disclosure.

FIG. 8 is a flowchart that illustrates a method of deriving time information by measuring time taken in outputting a clock signal from a source device to a sink device in the sink device according to one embodiment of the present disclosure.

As shown in FIG. 8, the sink device derives and stores the time information through a series of processes as follows. The sink device specifies the source device selected as the current input source, calls the time information corresponding to the specified source device, and thus operates as described in the foregoing embodiments. Therefore, the processes to be described below may be performed at a certain point coming before the operations of the foregoing embodiments.

At operation 810 the sink device receives a user's command for switching the content input source. The command for switching the content input source is issued by a user's input through a predetermined UI provided on the sink device.

At operation 820 the sink device specifies the source device switched as the current input source. The source device is specified based on the device information previously stored in the sink device according to the source devices.

At operation 830 the sink device turns on the source device and starts measuring time. The source device is turned on in response to a control signal transmitted from the sink device to the source device.

At operation 840 the sink device measures and stores time required in receiving the clock signal from the source device.

At operation 850 the sink device determines whether an aggregated number of times of measuring the stored time required is higher than a threshold. Here, the threshold refers to the minimum measuring times needed for generating time information about a certain source device.

When the number of measuring times is not higher than the threshold, the sink device does not perform an additional operation since aggregated data for generating the time information is insufficient. In the future, the sink device performs the operations 810 to 850 again in the next measuring process for the source device.

When the number of measuring times is higher than the threshold, at operation 860 the sink device obtains an average value from aggregated values of time required.

Here, the average value may be calculated by an expression for various mathematical averages such as an arithmetic mean.

At operation 870 the sink device stores the obtained average value as the time information corresponding to the source device.

Thus, the sink device may derive the time information for determining the point at which the clock signal is received from the source device.

Meanwhile, as explained in the foregoing embodiments, the point of outputting the clock signal and the point of outputting the content signal are different according to the source devices. When a period of time between the point of outputting the clock signal and the point of outputting the content signal is relatively too short, a screen is instantly switched over to a content image before a user realizes even though the UI is displayed during this period of time. Therefore, in this case, it may be inconvenient for a user because the sudden screen switching is caused by the display of the UI. In this regard, descriptions will be made below.

Figure 9:
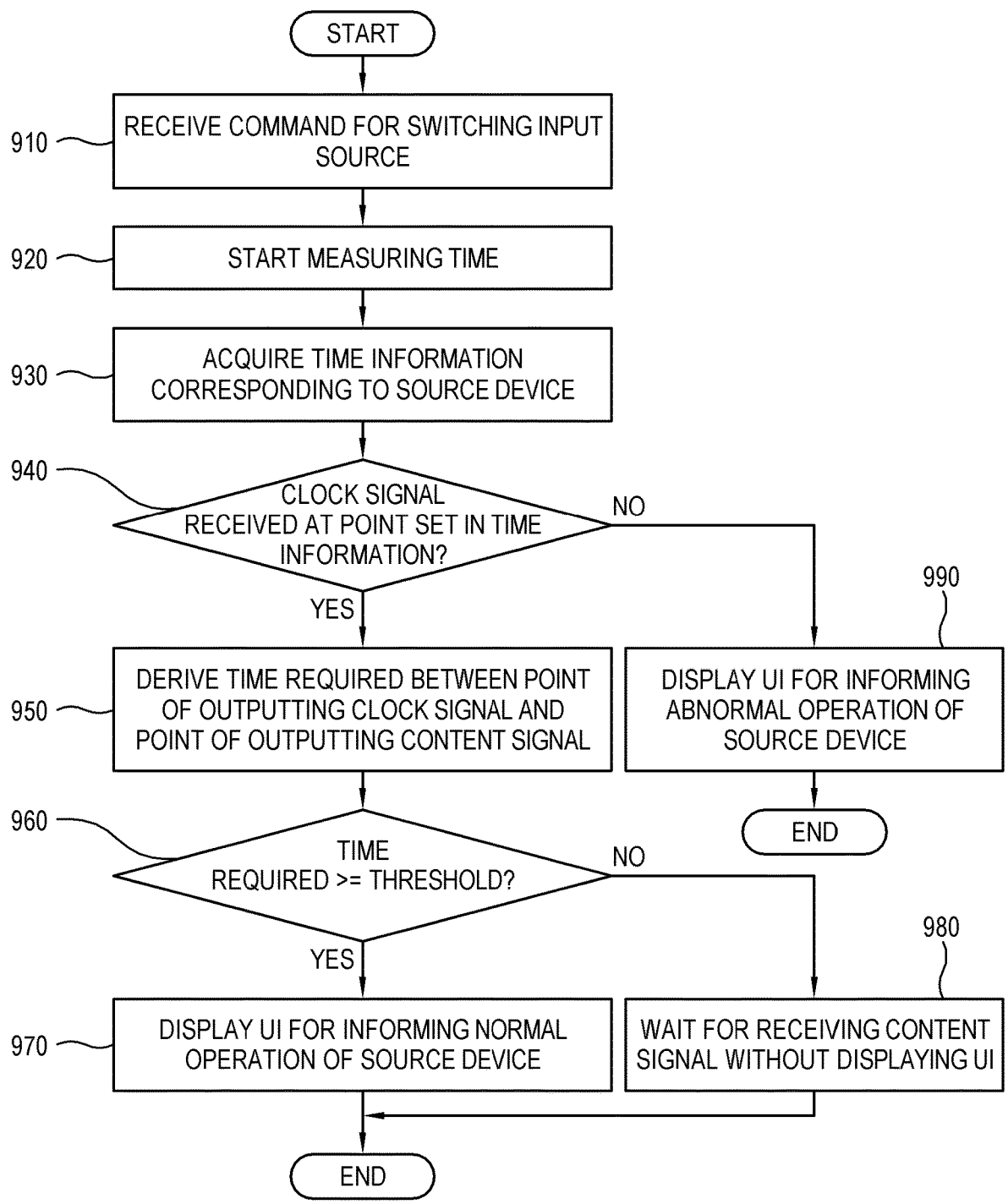
FIG. 9 is a flowchart that illustrates a method of selectively performing an operation of displaying a UI in accordance with a taken time of a clock signal designated in time information in a sink device according to one embodiment of the present disclosure.

FIG. 9 is a flowchart that illustrates a method of selectively performing an operation of displaying a UI in accordance with a taken time of a clock signal designated in time information in a sink device according to one embodiment of the present disclosure.

As shown in FIG. 9, the sink device performs operations as follows.

At operation 910 the sink device receives a user's command for switching the current settings of the input source.

At operation 920 the sink device turns on the source device corresponding to the command, and starts measuring time.

At operation 930 the sink device acquires time information corresponding to the switched source device. In the time information, a period of time taken from a point of turning on the source device to a point of outputting the clock signal, and a period of time taken from a point of outputting the clock signal to a point of outputting a content signal are designated.

At operation 940 the sink device determines whether the clock signal is received at the point designated in the time information.

When the clock signal is received at the designated point, at operation 950 the sink device derives a period of time between the point of outputting the clock signal and the point of outputting the content signal from the time information.

At operation 960 the sink device determines whether the derived period of time is greater than a threshold. In other words, the sink device determines whether the time required until the content signal is output after the clock signal is output is relatively long or not. When the time required is relatively long, the sink device needs to inform a user that the source device operates normally. On the other hand, when the time required is relatively short, it means that the content image will be displayed just after the clock signal is output. Therefore, it is not very useful even though the sink device informs a user that the source device operates normally.

When the derived period of time is greater than the threshold, at operation 970 the sink device displays a UI for informing that the source device operates normally.

On the other hand, when the derived period of time is not greater than the threshold, at operation 980 the sink device does not display the UI. In this case, the sink device processes a received content signal and displays a content image based on the processed content signal without displaying the UI.

When the clock signal is not received at the designated point in the preceding operation 940, at operation 990 the sink device displays a UI for informing that the source device is in an abnormal state.

Thus, when the period of time between the point of outputting the clock signal and the point of outputting the content signal is relatively short, the sink device does not display the UI for informing that the source device is in the normal state, thereby preventing a screen from sudden switching from the UI over to the content image.

Meanwhile, in the foregoing embodiments, the sink device displays the UI by considering only the point of outputting the clock signal. However, as described above, the preset signal that can be output from the source device, which is designated in the time information, is not limited to only the clock signal. For example, the content signal may be taken into account as a condition for determining whether to display the UI. In this regard, embodiments will be described below.

Figure 10:
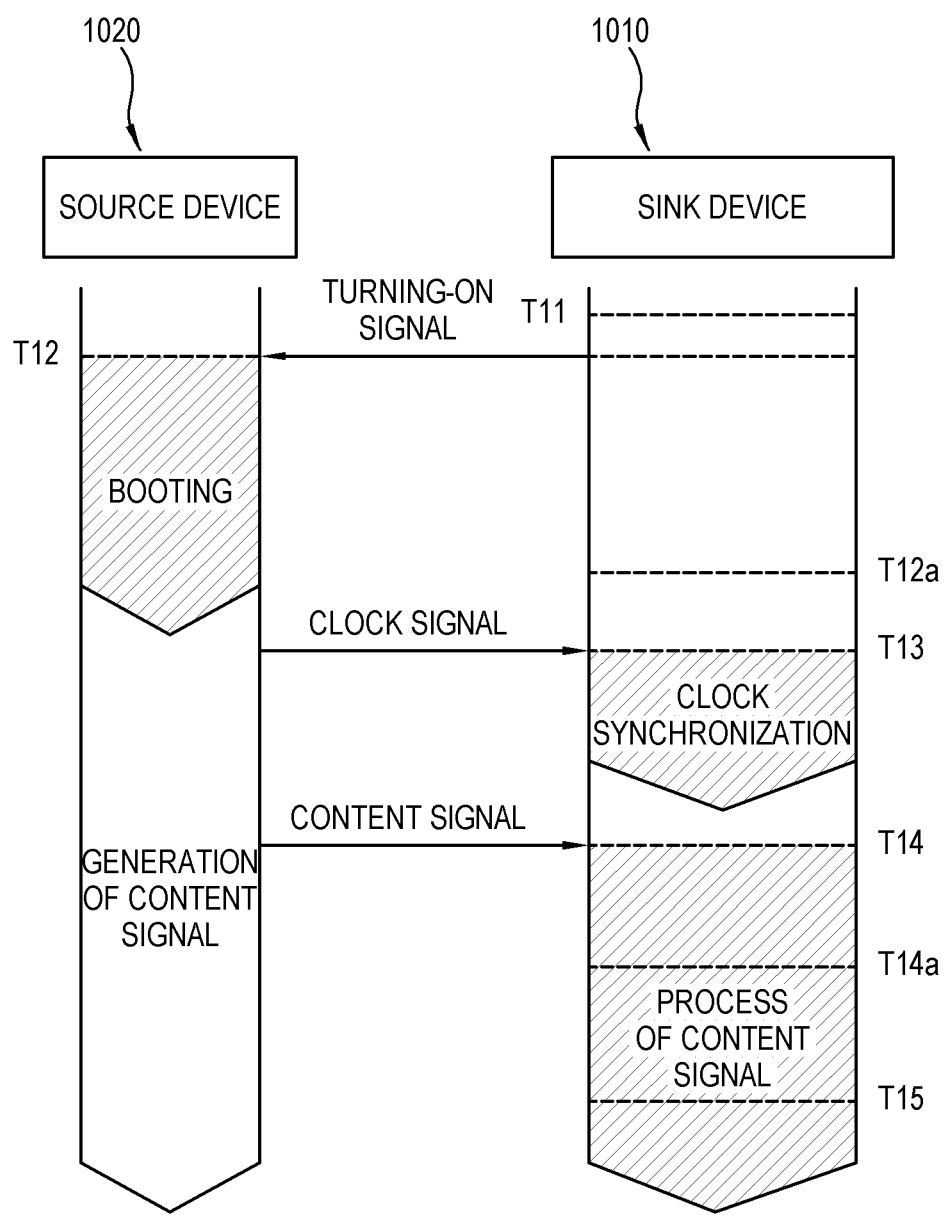
FIG. 10 illustrates a sequence of operations performed in a sink device and a source device to display a content image in the sink device according to another embodiment of the present disclosure.

FIG. 10 illustrates a sequence of operations performed in a sink device and a source device to display a content image in the sink device according to another embodiment of the present disclosure.

As shown in FIG. 10, when a user issues a command for switching an input source of a sink device 1010 over to a source device 1020 at a point T11, the sink device 1010 transmits a turning-on signal to the source device 1020 at a point T12, thereby turning on the source device 1020.

The completely booted source device 1020 first outputs a clock signal before outputting a content signal, and thus the clock signal is received in the signal device 1010 at a point T13. Then, the source device 1020 generates the content signal. The sink device 1010 performs clock synchronization with the source device 1020 in accordance with the clock signal received at the point T13.

When the source device 1020 outputs the content signal, the sink device 1010 receives the content signal from the source device 1020 at a point T14. The sink device 1010 processes the content signal and displays an image based on the content signal at a point T15.

A relatively very short time required between the point T13 and the point T14 means that the source device 1020 outputs the content signal immediately after outputting the clock signal. In this case, the sink device 1010 may not display the UI for showing the operational state of the source device 1020. However, in addition, when time required between the point T14 and the point T15 is relatively long, it is preferable that the UI is displayed to mitigate inconvenience of a user who cannot know the operational state of the source device 1020 until the content image is displayed. Thus, unlike the foregoing embodiments, the sink device 1010 operates as follows.

The sink device 1010 acquires the time information, in which the point of outputting the content signal from the source device 1020 is set, at a certain point T12*a* between the point T11 and the point T14. The point of outputting the content signal may be for example represented as time required from the point T12 of booting up the source device 1020 to the point T14 of initially outputting the content signal from the source device 1020.

After acquiring the time information, the sink device 1010 determines whether the content signal is output at the point set in the time information. For example, when the point T14 of outputting the content signal is substantially the same as the point set in the time information, the sink device 1010 displays a UI for informing that the source device 1020 operates normally, at a certain point T14a between the point T14 and the point T15. Thus, the sink device 1010 informs a user that the source device 1020 operates normally, before the content image is displayed.

On the other hand, when the content signal is not output at the point set in the time information, the sink device 1010 displays a UI for informing that the source device 1020 does not normally operate. Thus, the sink device 1010 informs a user that the source device 1020 does not normally operate, and guides the user to take follow-up actions with regard to the source device 1020.

Meanwhile, in the foregoing embodiments, the source device is being turned off when a user issues a command for initially switching the input source over to the source device through the sink device, and the user controls the remote controller of the sink device so that the control signal for turning on the source device can be transmitted from the sink device to the source device. In this case, the sink device is capable of recognizing the point of turning on the source device, i.e. the point of booting up the source device, and therefore operates as described in the foregoing embodiments.

On the other hand, the source device may have already been being turned on when the input source of the sink device is switched over to the source device. In this regard, an embodiment will be described below.

Figure 11:
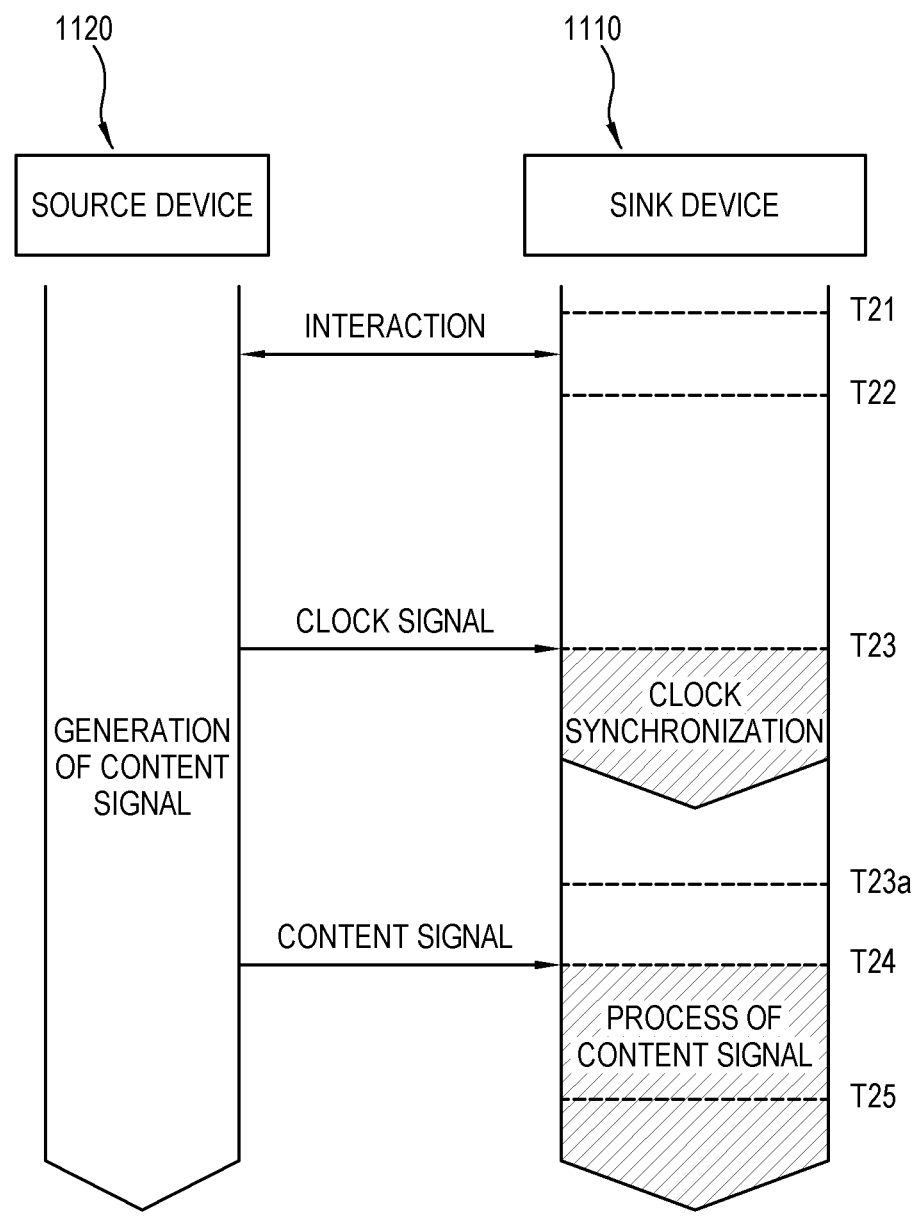
FIG. 11 illustrates a sequence of operations performed in a sink device and a source device to display a content image in the sink device according to still another embodiment of the present disclosure.

FIG. 11 illustrates a sequence of operations performed in a sink device and a source device to display a content image in the sink device according to still another embodiment of the present disclosure.

As shown in FIG. 11, a user issues a command for switching an input source of a sink device 1110 over to a source device 1120 at a point T21. Unlike the foregoing embodiments, the source device 1120 in this embodiment is being turned on now.

The sink device 1110 determines that the source device 1120 is being turned on now at a point T22 through interaction with the source device 1120. There are many methods for the interaction. For example, the sink device 1110 transmits a predetermined signal through a channel for the source device 1120, and determines that the source device 1120 is turned on when there is a response to the signal but determines that the source device 1120 is turned off when there are no responses to the signal. This method may be applied to the foregoing embodiments.

The sink device 1110 performs clock synchronization at a point T23 when the clock signal is received from the source device 1120.

The sink device 1110 processes a content signal by image processing processes at a point T24 when a content signal is received from the source device 1120. The sink device 1110 displays a content image at a point T25.

The sink device 1110 in this embodiment operates as follows.

The sink device 1110 acquires time information corresponding to the source device 1120 at a certain point T22a between the point T21 and the point T23, when the input source is switched over to the source device 1120 at the point T21.

The time information in this embodiment is substantially the same as that described in the foregoing embodiments.

The sink device 1110 determines that the source device 1120 normally operates when the clock signal is normally received at the point T23 designated in the time information. On the other hand, the sink device 1110 determines that the source device 1120 does not normally operate when the clock signal is not normally received at the point T23 designated in the time information.

Meanwhile, the sink device 1110 displays the UI for informing that the source device 1120 is connected as the input source at a certain point between the point T21 and the point T23, when the input source is switched over to the source device 1120 at the point T21. In accordance with results of interaction, additional operations are possible. For example, the sink device 1110 may display a UI for informing that the source device 1120 is being turned on, at a certain point between the point T22 and the point T23, when it is determined that the source device 1120 is being turned on.

Further, the sink device 1110 displays a UI for informing that the source device 1120 normally operates at a certain point T23a between the point T23 and the point T25, when it is determined that the source device 1120 normally operates. On the other hand, the sink device 1110 displays a UI for informing that the source device 1120 is in an abnormal state at the point T23a when it is determined that the source device 1120 does not normally operate.

Like this, the sink device 1110 determines the operational state of the source device 1120 before the point T25 and informs a user of the operational state of the source device 1120.

Although the present disclosure has been described with various embodiments, various changes and modifications may be suggested to one skilled in the art. It is intended that the present disclosure encompass such changes and modifications as fall within the scope of the appended claims.

What is claimed is:

1. A display device comprising:
a signal receiver configured to selectively connect with each of a plurality of external source devices, and configured to receive a content signal from the connected source device;
a display configured to display an image based on the content signal received by the signal receiver; and
a processor configured to:
acquire time information of the connected source device among the plurality of external source devices, the time information indicating a time from a point of the signal receiver being connected to the connected source device to a point of displaying the image corresponding to the content signal received by the signal receiver and being different from the time information for another of the plurality of source devices, and
control the display to display a user interface (UI) to indicate a connected state after the signal receiver is connected to the connected source device, based on the acquired time information,
wherein the processor is further configured to control the display to display the user interface for a period of time up to a point of receiving a preset signal, and change information provided on the user interface in accordance with whether the preset signal is received at a receiving point designated in the acquired time information.

2. The display device according to claim 1, wherein the preset signal comprises at least one of a clock signal and the content signal.

3. The display device according to claim 1, wherein the processor is further configured to:
control the display to change the displayed user interface to indicate that the connected source device is normally connected in response to the preset signal being normally received at the receiving point, and control the display to change the displayed user interface to indicate that the connected source device is not normally connected in response to the preset signal being not normally received at the receiving point.

4. The display device according to claim 3, wherein the processor is further configured to control the display to display the user interface to indicate a kind or model name of the connected source device for a period of time from the connection point up to a point of receiving a clock signal from the connected source device.

5. The display device according to claim 1, wherein the processor is further configured to:

control the display to change the displayed user interface in response to a period of time required from a point of outputting a clock signal to a point of outputting a content signal being greater than a threshold, and control the display not to change the displayed user interface in response to the period of time required being not greater than the threshold.

6. The display device according to claim 1, wherein the processor is further configured to determine a period of time from a point of connecting with the connected source device to the point of receiving the preset signal from the acquired time information, and to determine the receiving point designated in the acquired time information based on the determined period of time.

7. The display device according to claim 1, wherein the processor is further configured to measure a period of time up to a point of outputting the preset signal from the connected source device for a predetermined number of times, and to store an average of the measured periods of time as the acquired time information corresponding to the connected source device.

8. The display device according to claim 1, wherein the processor is further configured to determine a point of transmitting a control signal for turning on the connected source device as the point of the signal receiver being connected with the connected source device.

9. A method of controlling a display device, the method comprising:

selectively connecting with each of a plurality of external source devices;

acquiring time information of the connected source device among the plurality of external source devices, the time information indicating a time from a point of the connecting with the connected source device to a point of the display device displaying an image and being different from the time information for another of the plurality of source devices;

displaying a user interface (UI) to indicate a connected state after the display device is connected to the connected source device based on the acquired time information; and displaying the image based on a content signal in response to the content signal being output from the connected source device, wherein the displaying of the user interface comprises displaying the user interface for a period of time up to a point of receiving a preset signal, and changing information provided on the user interface in accordance with whether the preset signal is received at a receiving point designated in the acquired time information.

10. The method according to claim 9, wherein the preset signal comprises at least one of a clock signal and the content signal.

11. The method according to claim 9, wherein the changing of the information provided on the user interface comprises:

changing the displayed user interface to indicate that the connected source device is normally connected in response to the preset signal being normally received at the receiving point; and changing the displayed user interface to indicate that the connected source device is not normally connected in response to the preset signal being not normally received at the receiving point.

12. The method according to claim 11, wherein the displaying of the user interface comprises displaying the user interface to indicate a kind or model name of the connected source device for a period of time from the connection point up to a point of receiving a clock signal from the connected source device.

13. The method according to claim 9, wherein the displaying of the user interface further comprises:

changing the displayed user interface in response to a period of time from a point of outputting a clock signal to a point of outputting a content signal being greater than a threshold; and making no changes in the displayed user interface in response to the period of time being not greater than the threshold.

14. The method according to claim 9, wherein the displaying of the user interface comprises determining a period of time from a point of connecting with the connected source device to the point of receiving the preset signal from the acquired time information, and determining the receiving point designated in the acquired time information based on the determined period of time.

15. The method according to claim 9, further comprising measuring a period of time up to a point of outputting the preset signal from the connected source device for a predetermined number of times, and storing an average of the measured time for the periods of time as the acquired time information corresponding to the connected source device.

16. The method according to claim 9, further comprising determining a point of transmitting a control signal for turning on the connected source device as the point of the connecting with the one among the plurality of source devices.

17. A non-transitory computer-readable medium recording instructions for execution by a processor of an apparatus to cause the apparatus to perform operations comprising:

selectively connecting with each of a plurality of external source devices;

acquiring time information of the connected source device among the plurality of external source devices, the time information indicating a time from a point of the connecting with the connected source device to a point of displaying an image and being different from the time information for another of the plurality of source devices;

displaying a user interface (UI) to indicate a connected state after the apparatus is connected to the connected source device based on the acquired time information; and displaying an image based on a content signal in response to the content signal being output from the connected source device, wherein the displaying of the user interface comprises displaying the user interface for a period of time up to a point of receiving a preset signal, and changing information provided on the user interface in accordance with whether the preset signal is received at a receiving point designated in the acquired time information.

* * * * *